US009889876B2

(12) United States Patent
Russell et al.

(10) Patent No.: US 9,889,876 B2
(45) Date of Patent: Feb. 13, 2018

(54) METHODS AND SYSTEMS FOR CONTROLLING STEERING RESPONSE AND STEERING TORQUE FEEDBACK BASED ON STEERING POSITION

(71) Applicant: FORD GLOBAL TECHNOLOGIES, LLC, Dearborn, MI (US)

(72) Inventors: David Michael Russell, Ann Arbor, MI (US); Lodewijk Wijffels, Canton, MI (US); Robert J. Garby, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2 days.

(21) Appl. No.: 14/948,806

(22) Filed: Nov. 23, 2015

(65) Prior Publication Data
US 2017/0144692 A1 May 25, 2017

(51) Int. Cl.
*B62D 5/04* (2006.01)
*B62D 15/02* (2006.01)

(52) U.S. Cl.
CPC .............. *B62D 5/04* (2013.01); *B62D 15/021* (2013.01); *B62D 15/025* (2013.01)

(58) Field of Classification Search
CPC .......... B62D 1/18; B62D 5/008; B62D 6/008
USPC ........ 701/41, 43; 180/402, 412, 444; 74/493
See application file for complete search history.

(56) References Cited

U.S. PATENT DOCUMENTS

| 6,186,267 B1 | 2/2001 | Hackl et al. | |
| 6,637,284 B1 * | 10/2003 | Gaeth | B62D 1/181 |
| | | | 74/492 |
| 6,728,615 B1 * | 4/2004 | Yao | B62D 6/008 |
| | | | 180/402 |
| 6,782,316 B2 | 8/2004 | Breed et al. | |
| 7,379,803 B2 * | 5/2008 | Lim | B62D 1/18 |
| | | | 180/444 |

(Continued)

FOREIGN PATENT DOCUMENTS

| EP | 1935754 A1 | 6/2008 |
| JP | H09254804 A | 9/1997 |

(Continued)

*Primary Examiner* — Thomas G Black
*Assistant Examiner* — Wae L Louie
(74) *Attorney, Agent, or Firm* — Jones Robb, PLLC; Raymond Coppiellie

(57) ABSTRACT

Arrangements (e.g., method; vehicle; non-transitory, tangible, machine-readable media embodying a program) for controlling nominal vehicle steering characteristics in a vehicle steering system are disclosed. A method of controlling nominal vehicle steering characteristics includes determining an actual position of an adjustable steering component of the vehicle, comparing the actual position to a reference position of the component, and based at least in part on the comparison, adjusting at least one of the steering ratio and a steering torque feedback in the vehicle steering system. In one embodiment, based at least in part on the comparison, a percentage of change in a steering ratio for a range of steering wheel angles is calculated and, based on the percentage of change, at least one of the steering ratio and a steering torque feedback in the vehicle steering system is adjusted to a nominal value associated with the nominal vehicle steering characteristics.

28 Claims, 4 Drawing Sheets

(56) References Cited

U.S. PATENT DOCUMENTS

| | | | |
|---|---|---|---|
| 7,908,056 B2* | 3/2011 | Hwang | B62D 5/006 701/41 |
| 8,532,876 B2* | 9/2013 | Igarashi | B62D 5/008 180/412 |
| 8,676,450 B2* | 3/2014 | Kohara | B62D 1/181 116/31 |
| 9,031,745 B2* | 5/2015 | Bahena | B62D 6/10 180/204 |
| 9,073,575 B2 | 7/2015 | Bryant | |
| 9,150,238 B2 | 10/2015 | Alcazar et al. | |
| 2008/0027609 A1* | 1/2008 | Aoki | B62D 5/0463 701/43 |
| 2008/0249686 A1* | 10/2008 | Mikuriya | B62D 6/002 701/42 |
| 2009/0048736 A1* | 2/2009 | Kristensen | B62D 6/002 701/42 |
| 2013/0233117 A1* | 9/2013 | Read | B62D 1/181 74/493 |
| 2013/0261894 A1* | 10/2013 | Kojima | B62D 5/0463 701/41 |
| 2014/0180541 A1 | 6/2014 | Yu et al. | |
| 2014/0277944 A1* | 9/2014 | Bean | B62D 6/008 701/41 |
| 2014/0303848 A1 | 10/2014 | Bean et al. | |
| 2015/0239488 A1 | 8/2015 | Caverly et al. | |
| 2015/0259007 A1* | 9/2015 | Di Cairano | B62D 15/025 701/41 |
| 2015/0291210 A1* | 10/2015 | Kageyama | B60T 8/1755 701/41 |
| 2015/0360715 A1* | 12/2015 | Shimizu | B62D 5/001 701/43 |
| 2017/0021862 A1* | 1/2017 | Akatsuka | B62D 15/025 |
| 2017/0144692 A1* | 5/2017 | Russell | B62D 5/04 |

FOREIGN PATENT DOCUMENTS

| | | |
|---|---|---|
| JP | 2003205846 A | 7/2003 |
| KR | 100968066 B1 | 6/2010 |

* cited by examiner

METHODS AND SYSTEMS FOR CONTROLLING STEERING RESPONSE AND STEERING TORQUE FEEDBACK BASED ON STEERING POSITION

TECHNICAL FIELD

The present teachings relate generally to arrangements using knowledge about a real-time adjustable tilt and/or telescopic steering position of a steering column and/or steering wheel, to deliver intended steering response and steering feel torque feedback.

BACKGROUND

Steering systems have inherent non-linearities due to geometric location and angular behavior of the u-joints required for packaging. In particular, movement of the steering wheel in and out (telescoping) and/or up and down (rake or tilt) can cause deviations in the intended nominal function (e.g., response) of the steering system. Conventional vehicles attempt to compensate for such positional (geometric) changes in the steering system, however, such compensation effects are noticeable only when the driver keeps the steering wheel in the position in which the vehicle development was done (i.e., in the straight ahead position). All other positions will see more response (and more steering wheel torque feedback) or less response (and less steering wheel torque feedback) than this nominal function. In particular, conventional steerable vehicles deliver an intended (i.e., engineered or nominal) steering response and steering feel torque feedback at only one (e.g., nominal or reference (e.g., mid-point)) tilt and/or (e.g., mid-point) telescopic steering position such that non-intended (differing) responses and feedback are felt at non-nominal tilt and/or telescopic steering positions. Accordingly, it would be desirable for a steerable vehicle to deliver the same (i.e., substantially consistent) intended (i.e., engineered or nominal) steering response and steering feel torque feedback, throughout entire ranges of adjustable tilt and/or telescopic steering positions of a steering column and/or steering wheel.

SUMMARY

In accordance with the various example embodiments disclosed, a method of controlling nominal vehicle steering characteristics in a vehicle steering system is disclosed. The method comprises determining an actual position of an adjustable steering component of the vehicle, comparing the actual position to a reference position of the component, and based at least in part on the comparison, adjusting at least one of the steering ratio and a steering torque feedback in the vehicle steering system.

In accordance with another example embodiment, comparing the actual position to the reference position of the component includes determining a percentage of change of the steering ratio at each steering wheel angle in a range of possible steering wheel angles. For example, in a full (lock-to-lock) range of possible steering wheel angles for the vehicle.

Another example embodiment concerns the adjusting at least one of the steering ratio and the steering torque feedback includes adjusting the steering ratio or the steering torque feedback to a nominal value associated with the nominal vehicle steering characteristics.

In accordance with yet another example embodiment, a method of controlling nominal vehicle steering characteristics in a vehicle steering system comprises determining an actual position of an adjustable steering component of the vehicle, comparing the actual position to a reference position of the component, based at least in part on the comparison, calculating a percentage of change in a steering ratio for a range of steering wheel angles, and based on the percentage of change, adjusting at least one of the steering ratio and a steering torque feedback in the vehicle steering system to a nominal value associated with the nominal vehicle steering characteristics.

In accordance with another example embodiment, a system for controlling nominal vehicle steering characteristics in a vehicle steering system is provided. The system comprises at least one sensor configured to provide data relating to a position of at least one component of the steering system, a controller operatively associated with the at least one sensor and configured to: determine an actual position of an adjustable steering component of the vehicle based on sensor data, compare the actual position to a reference position of the component, and based at least in part on the comparison, adjust at least one of the steering ratio and a steering torque feedback in the vehicle steering system.

In accordance with a further example embodiment, a vehicle having controlled nominal vehicle steering characteristics in a vehicle steering system is disclosed. The vehicle comprises a steering wheel, a steering column, at least one sensor configured to provide data relating to a position of at least one of the steering wheel and/or steering column, a controller operatively associated with the at least one sensor and configured to: determine an actual position of an adjustable steering component of the vehicle based on sensor data, compare the actual position to a reference position of the component, and based at least in part on the comparison, adjust at least one of the steering ratio and a steering torque feedback in the vehicle steering system.

Yet a further example embodiment concerns a non-transitory, tangible, machine-readable media embodying a program which, when implemented via a controller, effecting operations for controlling nominal vehicle steering characteristics in a vehicle steering system, the operations comprising: determining an actual position of an adjustable steering component of the vehicle; comparing the actual position to a reference position of the component; and based at least in part on the comparison, adjusting at least one of the steering ratio and a steering torque feedback in the vehicle steering system.

Additional objects and advantages will be set forth in part in the description which follows, and in part will be obvious from the description, or may be learned by practice of the present teachings. The objects and advantages of the teachings will be realized and attained via the elements and combinations particularly pointed out in the appended claims.

It is to be understood that both the foregoing general description and the following detailed description are example and explanatory only and are not restrictive of the present disclosure, as claimed. The accompanying drawings, which are incorporated in and constitute part of this specification, illustrate example embodiments of the present disclosure and together with the description, serve to explain principles of the disclosure.

BRIEF DESCRIPTION OF THE DRAWINGS

At least some features and advantages of the present teachings will be apparent from the following detailed description of example embodiments consistent therewith, which description should be considered with reference to the accompanying drawings, wherein.

Figure 1:
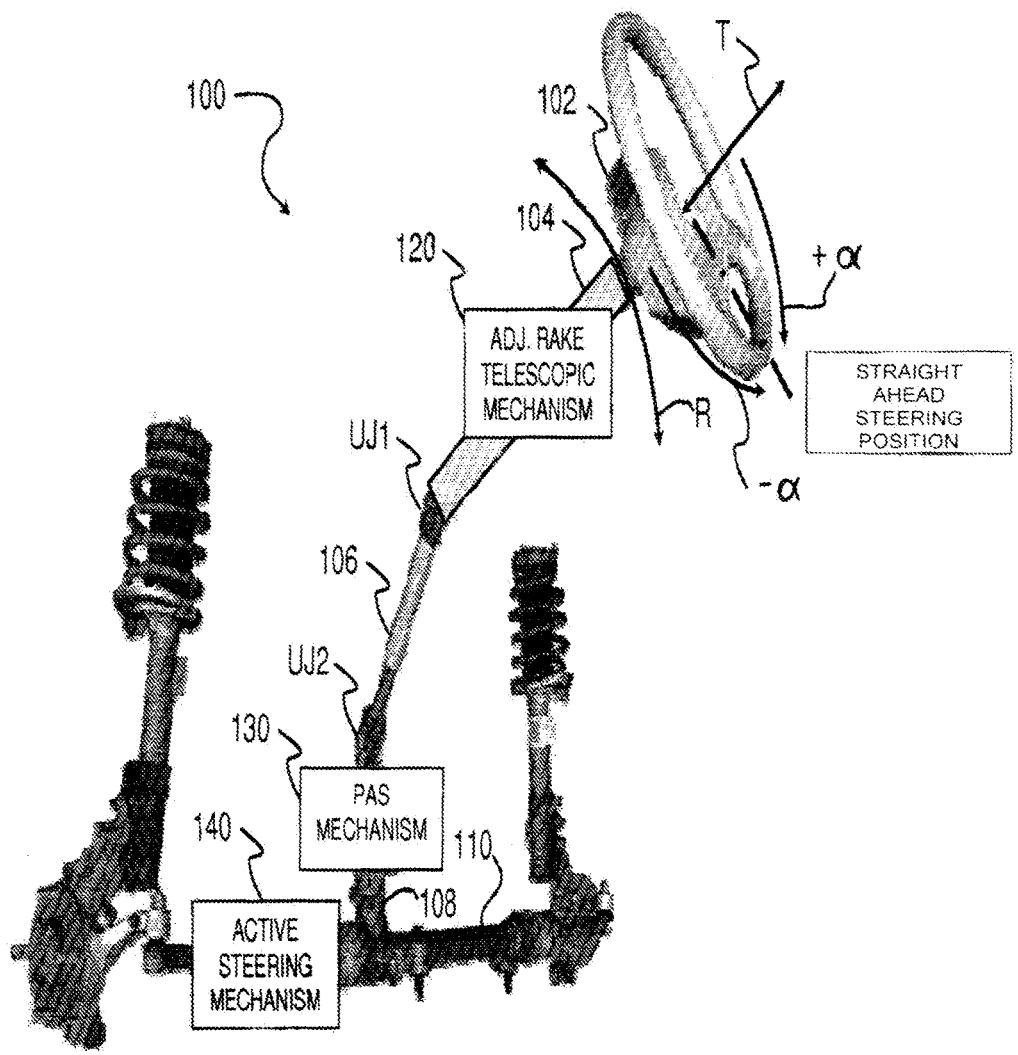
FIG. 1 illustrates an exemplary embodiment of a steering system according to the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

While the present teachings are described using a two-wheeled steering arrangement of a four-wheeled motor vehicle as an example, practice of the present disclosure is not limited thereto, e.g., the present disclosure contemplates that the teachings may be practiced with one-wheeled or two wheeled steering arrangements of three-wheeled motor vehicles, etc.

Still further, while the present teachings are described using a front active steering arrangement of front wheel steering, practice of the present disclosure is not limited thereto, e.g., the present disclosure contemplates that the teachings may be practiced with a rear active steering arrangement of rear wheel steering, or in parallel (e.g., simultaneously) with both front and rear active steering arrangements of front and rear wheel steering.

Active steering may be described as a steering system for a vehicle, in which a relationship (e.g., steering ratio (SR)) between a driver's steer inputs and an angle of the steered road wheels, may be continuously and intelligently altered. For example, at lower speeds, active steering may reduce the amount (e.g., ratio) that the steering wheel must be turned in order to turn the road wheels—improving performance in situations such as parking and other urban area traffic maneuvers. At higher speeds, the active steering may increase the amount (e.g., ratio) that the steering wheel must be turned in order to turn the road wheels, i.e., such that the normal increased responsiveness from speed is avoided, and improved directional stability is provided.

As noted in the background, steering systems have inherent non-linearities due to geometric location and angular behavior of u-joints, for example, required for packaging of a wheeled vehicle. These non-linearities contribute to deviations from an intended overall steering experience in terms of vehicle response and steering wheel torque feedback. More particularly, one source of deviation from the detected or derived steering wheel feel arises because of the physical geometry of the u-joints, shafts, etc., that may be present in the steering system. That is, where two components are linked by a joint and at an angle, then a rotation of the steering wheel may not be accurately translated by those components. Typically, there is a reasonably strong degree of 180° phase overlay. Assuming this overlay is centered about the straight ahead steering wheel position, this overlay can be selected to either speed up the overall steering ratio on center or to lower it. And, as the driver steers to +/−90°, this effect is reversed.

As a result of the above, measurement of steering wheel angle (a) taken downstream of components linked at an angle (such as shafts) may incorporate an error. The geometry is such that a variation in the angle through which the steering wheel has been turned or rotated does not necessarily correspond to an equal variation in the angle of the output shaft. Each joint introduces a different phasing between the angle at its input shaft and the angle at its output shaft due to the angle between the linked components (which is non-zero or not 180°), stiffness, friction, stiction, free-play and possibly other factors as well. The amount of phase-shifting introduced may also be dependent upon the speed of rotation of the shafts, the angle of the joints, the angle between the shafts, etc.

A further possible source of deviation from the intended steering wheel feel is that steering wheels may include, for example, substantial components such as air bags, control devices and safety features. As such, the weight of the steering wheel (and for these and other reasons, also the steering column) may not be uniformly distributed around its center of rotation, and this can generate an undesired fluctuating torque as the steering wheel is turned. In other words, the steering wheel system behaves as if there was an off-centre mass, offset from the axis of rotation and this offset mass can generate an undesired and fluctuating torque that is referred to herein as torque contribution (Tweight). The magnitude or degree of such fluctuating torque may vary with changes in adjustable tilt and/or telescopic steering positions of a steering column and/or steering wheel. For example, a steering wheel having a more horizontal posturing plane, may experience a lesser magnitude or degree of fluctuating torque, while a steering wheel having a more vertical posturing plane, may experience a greater magnitude or degree of fluctuating torque (i.e., the off-center mass would be moving up and down to a greater degree in a more vertical steering wheel posturing plane).

As a result, even if the steering wheel is rotating at a constant speed, a torque actually measured or felt by a vehicle's driver may not be constant, but rather may contain a fluctuation having a degree which is dependent upon the steering column/wheel rake/telescope settings, and upon the steering wheel angle (a). This in turn has an impact (for example causes non-linearity) on the steering feel.

Another impact of the offset mass may appear on the output side of the PAS system. The torque contribution (Tweight) is a torque that the electric motor needs to "fight" against. For example, if the electric motor is providing a constant torque, this does not translate into a linear motion (constant angular velocity) of the steering wheel, because when the offset weight is "lifted" (e.g., in a more vertical steering wheel posturing plane), the steering wheel velocity will drop, and likewise, when the weight is "falling" the steering wheel velocity will increase (due to the extra momentum of the weight).

The present disclosure seeks to mitigate certain undesirable effects of these and other factors or "error states." In the exemplary embodiments discussed below, methods and systems which compensate for and/or mitigate the non-linear joint geometry and unbalanced weight of the column/steering wheel are described.

Unfortunately, prior to the teachings of this disclosure, intended overall steering experience would be ideally achieved at only one steering wheel (nominal or reference) position in terms of its rake (up and down tilt) and/or telescope (towards and away from the driver) settings. As the driver adjusts the wheel position out of this nominal or reference position, the geometric effect of this change, adjusts both the magnitude and the phase relationship of the steering ratio change due to the u-joints, for example. Thus, only the driver that keeps the steering wheel in the reference position in which the vehicle development was done, will truly experience the intended nominal steering function. All other positions will see either more response (and more steering wheel torque feedback) or less responses (and less steering wheel torque feedback) than this nominal.

The present disclosure provides methods and systems that compensate for this effect on vehicles that have, for example, Active Front Steer (AFS) systems. Properly selected, an active steering effect can be used to blend with the inherent steering wheel/column, chassis and tire response non-linearities, to deliver an intended overall steering experience in terms of both response and steering wheel torque feedback, i.e., at all steering column/wheel rake/telescope positions. More particularly, an active front steer system changes the steering ratio actively both above and below the mechanical ratio. By using knowledge (via linear actuator settings and/or sensors) of the actual steering column/wheel location in terms of rake and/or telescope, the active front steer system can be designed (e.g., programmed) to remove the change in steering ratio due to any non-nominal column/wheel position. Further, vehicles with Power Assist Steering (PAS) (e.g., Electric Power Assist Steering (EPAS)) can compensate for the steering torque feedback change due to any non-nominal column/wheel position.

By recognizing and compensating for the steering wheel location in terms of real-time tilt and/or telescope settings, a much broader range of drivers may be able to experience the intended nominal function of the steering system. Mapping of the change to steering ratio change (and therefore steering torque feedback levels) through its range of tilt and/or telescope can be done geometrically and/or measured in vehicle. This mapping can be applied, for example, to the active front steering and/or electric power assist steering system algorithm to compensate for (e.g., counteract) any change from the nominal response, and return the vehicle's steering response and/or steering torque feedback levels and linearity back to that of the intended nominal wheel position. That is, any change deviating from the intended (i.e., engineered or nominal) steering response and steering feel torque feedback may be compensated for or counteracted, so that the steering response and steering feel torque feedback experienced by any driver at any non-reference adjustable tilt and/or telescopic steering positions of a steering column and/or steering wheel, can be made to emulate the intended steering response and steering feel torque feedback experienced at the reference nominal position.

Turning now to the drawings, FIG. 1 shows an exemplary steering arrangement 100 for two front wheels. Shown is a steering wheel 102 connected at one end to a steering column 104, and a first universal joint (u-joint) UJ1 at the other end of the steering column. In turn, the UJ1 is also connected to one end of a first steering shaft 106 which is connected to a second u-joint UJ2 at the other end thereof. The UJ2 is connected to a second steering shaft 108 which is connected to a front axle 110.

An adjustable rake and telescopic mechanism 120 may be connected, for example, to the steering column 104, for allowing driver adjustment of an up-and-down rake R adjustment of the steering column 104 and/or steering wheel 102. Such driver adjustment may be a manual adjustment (e.g., via the driver manually releasing a locking mechanism and manually adjusting the steering column 104 and/or steering wheel 102 into any of several predefined setting positions), or may be a motorized electrical adjustment (e.g., via the driver operating electrical switches to control the actuation of one or more motors (e.g., linear actuator motors)). If the steering column 104 and/or steering wheel 102 rake R is adjustable into predefined setting positions, then sensors provided at each predefined setting position, for example, may provide knowledge (e.g., via grounding or signaling) of a real-time rake R setting position of the steering column 104 and/or steering wheel 102. Alternatively, if the steering column 104 and/or steering wheel 102 rake R is freely adjustable into any setting position (e.g., via a linear motor), then a setting of the linear motor, for example, may provide knowledge of a real-time rake R setting position of the steering column 104 and/or steering wheel 102, without the use of sensors.

The adjustable rake and telescopic mechanism 120 may also allow driver adjustment of an in-and-out telescopic adjustment T of the steering column 104 and/or steering wheel 102, toward or away from the driver. Such driver adjustment may be a manual adjustment (e.g., via the driver manually releasing a locking mechanism and manually adjusting the steering column 104 and/or steering wheel 102 into any of several predefined setting positions), or may be a motorized electrical adjustment (e.g., via the driver operating electrical switches to control the actuation of one or more motors (e.g., linear actuator motors)). If the steering column 104 and/or steering wheel 102 telescopic T positioning is adjustable into predefined setting positions, then sensors provided at each predefined setting position, for example, may provide knowledge (e.g., via grounding or signaling) of a real-time telescopic T setting position of the steering column 104 and/or steering wheel 102. Alternatively, if the steering column 104 and/or steering wheel 102 telescopic T positioning is freely adjustable into any setting position (e.g., via a linear motor), then a setting of the linear motor, for example, may provide knowledge of a real-time telescopic setting position of the steering column 104 and/or steering wheel 102, without the use of sensors.

More broadly, sensors may be provided to monitor positions of any of the adjustable rake and telescopic mechanism 120, steering wheel 102, steering column 104, first u-joint UJ1, first steering shaft 106, second u-joint UJ2, second steering shaft 108, front axle 110, and or linear actuators (not shown), to provide knowledge of a real-time rake and/or telescopic setting position of the steering column 104 and/or steering wheel 102. Again, sensors may not be needed in determining positioning of linear actuators, in that a setting of the linear actuator provides information regarding positioning.

A power assist steering (PAS) mechanism 130 may be connected, for example, to the second steering shaft 108 and/or front axle 110, to apply (e.g., supplement) or subtract (e.g., remove) torque from the steering arrangement as necessary, for example: to assist the vehicle's driver application of torque to the steering arrangement; to smooth out a torque feedback felt by the vehicle's driver, etc. The PAS mechanism may, for example, be an electric PAS (EPAS) mechanism, which applies or subtracts torque to/from the steering arrangement using, for example, one or more controlled electric motors. Any reference in this disclosure to the term "torque" (also known as moment or moment of force), is to be taken to have its normal meaning being a turning or rotational force (e.g., a force that causes rotation of an object).

An active steering mechanism 140 may be connected, for example, to the front axle 110, to change the steering ratio actively both above and below a nominal mechanical ratio. As will be understood by those of ordinary skill in the art, the nominal mechanical ratio is the steering ratio curve (vs steering wheel angle) that the passive steer achieves through the combination of the steering rack ratio, suspension steer geometry, and the intermediate shaft and column design (number of sliders, number and location/orientations of u-joints, etc. Steering ratio refers to the ratio between the driver input at the steering wheel (i.e., the amount of rotation of the steering wheel in degrees) and the output at the wheels (i.e., the amount of rotation of the wheels in degrees). As one example, the active steering mechanism 140 may be connected to, and actively vary a mechanical ratio of, a rack and pinion arrangement of the front axle 110 arrangement.

Figure 2:
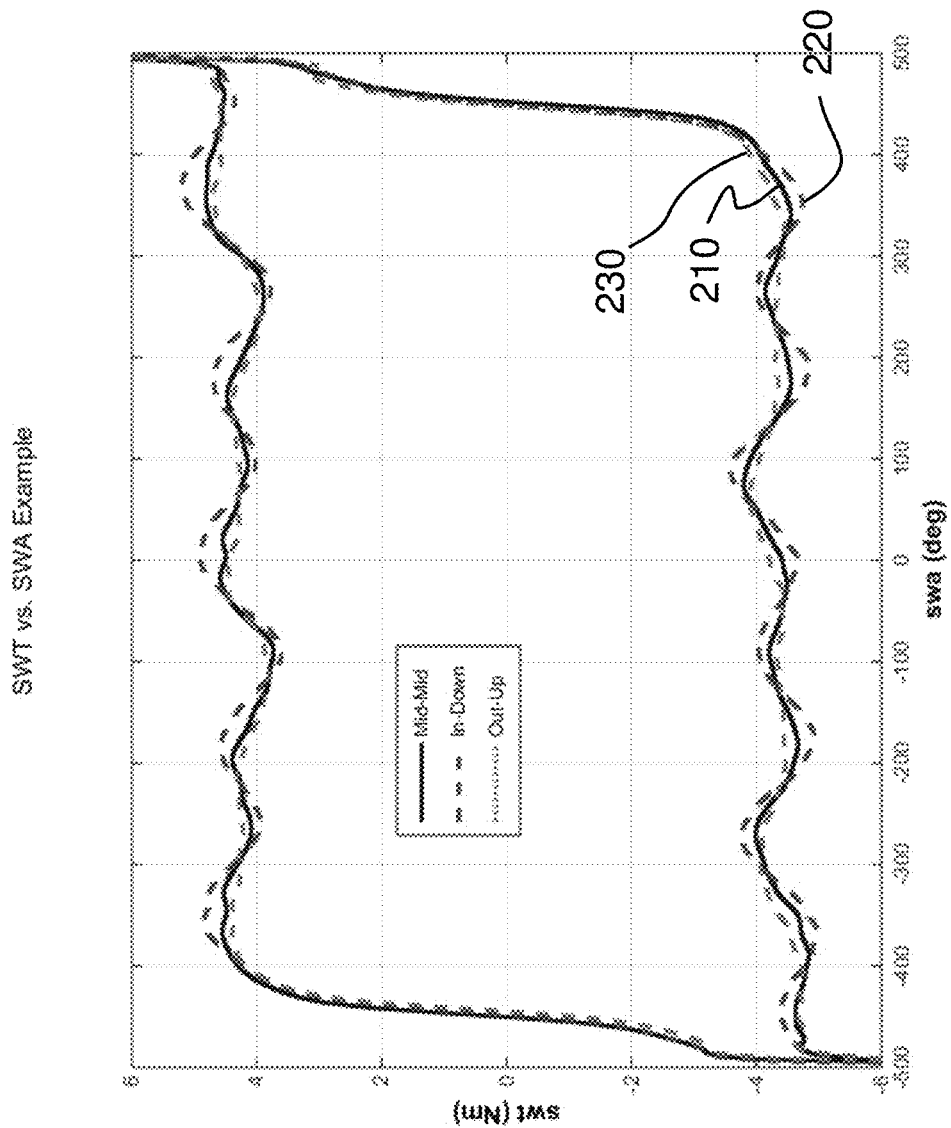
FIG. 2 is a graph illustrating exemplary variations in amplitude and phasing of Steering Wheel Torque (SWT) feedback due to rake and telescope position in a vehicle steering system.

FIG. 2 illustrates example variations 200 in amplitude and phasing of Steering Wheel Torque (SWT) feedback due to changes in rake and telescope position. More particularly, the graph illustrates a Steering Wheel Angle (SWA) vs. Steering Wheel Torque (solid line) plot 210 for a steering wheel having a nominal (Mid-Mid) position (e.g., the steering wheel is not tilted or telescopically adjusted from the factory default position), and plots 220, 230 for other positions of the steering wheel in which the rake and telescopic positions are adjusted (In-Down; Out-Up), respectively. As can be seen by the various plots, the SWT experienced by the driver while the steering wheel is in the other (non-nominal) positions (In-Down; Out-Up) differs from the nominal SWT experienced by the driver while the steering wheel is in the nominal (Mid-Mid) position. Such differing SWT may be compensated for by, for example, the EPAS system and/or the active steering system. That is, any difference may be calculated, and based, for example, on such difference, the EPAS system and/or the active steering system may be controlled to offset (or counteract) the differing SWT, such that the driver experiences (feels) the nominal (or intended) SWT at all steering wheel rake and/or telescope positions.

Figure 3:
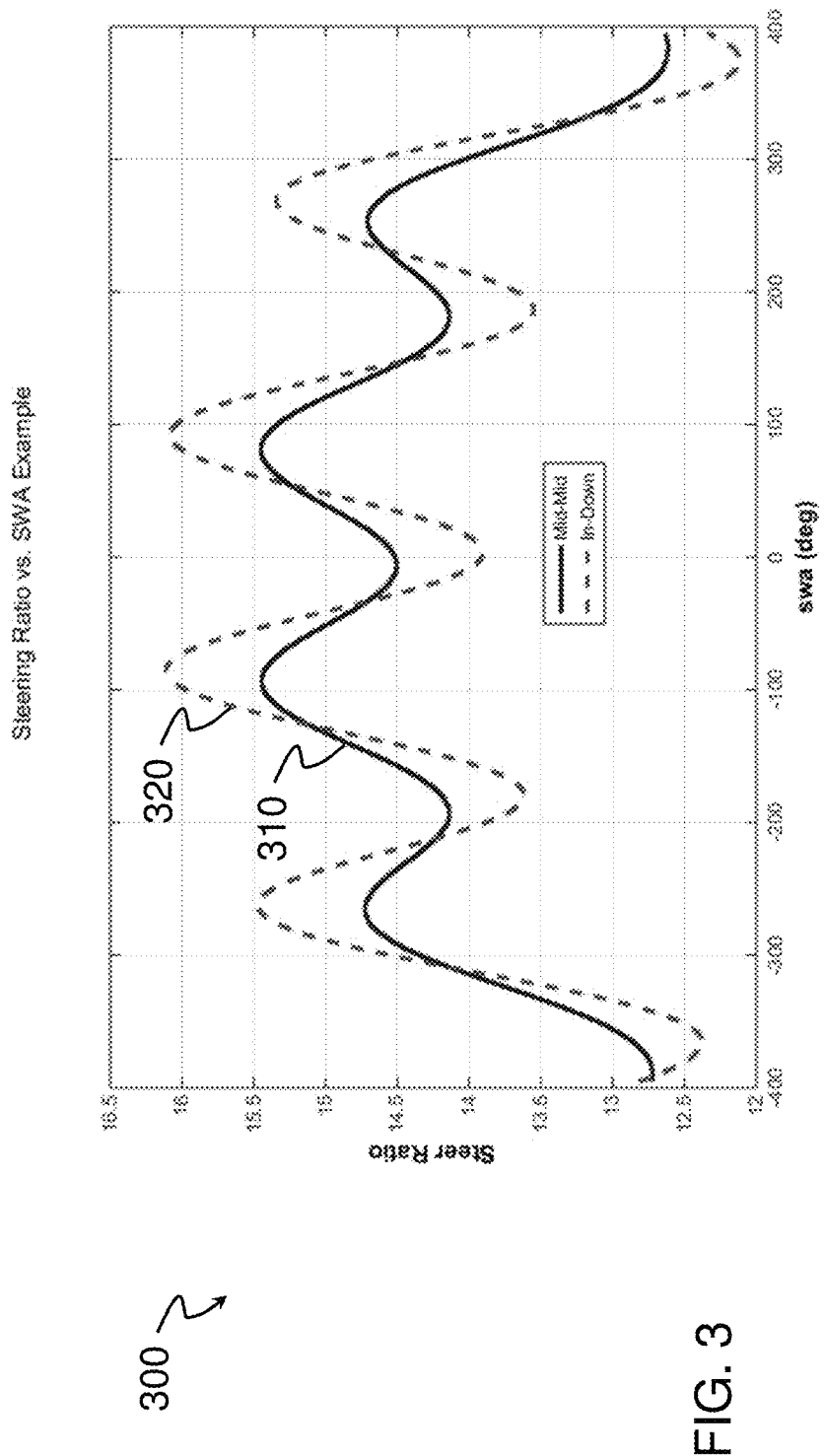
FIG. 3 is a graph illustrating exemplary variations in amplitude and phasing of Steering Ratio (SR) due to rake and telescope position in a vehicle steering system, resulting in changes in vehicle response to steering wheel angle (SWA) input in accordance with the present teachings.

FIG. 3 illustrates exemplary variations 300 in amplitude and phasing of Steering Ratio (SR) due to changes in rake and telescope position, resulting in changes in vehicle response to SWA input. More particularly, the graph illustrates a Steering Wheel Angle (SWA) vs. Steering Ratio (solid line) plot 310 for a steering wheel having a nominal (Mid-Mid) position, and (dashed-line) plot 320 for another position (In-Down). As can be seen by the various plots, the SR experienced by the driver while the steering wheel is in the other (non-nominal) positions (In-Down) differs from the nominal SR felt by the driver while the steering wheel is in the nominal (Mid-Mid) position. Such differing SR results in differing SWTs and differing vehicle steering responses which may be compensated for by, for example, the EPAS system and/or the active steering system. That is, any difference may be calculated, and based, for example, on such difference, the EPAS system and/or the active steering system may be controlled to offset (or counteract) the differing SR, such that the driver experiences (feels) the nominal SWT and/or nominal vehicle steering response at all steering wheel rake and/or telescope positions.

Figure 4:
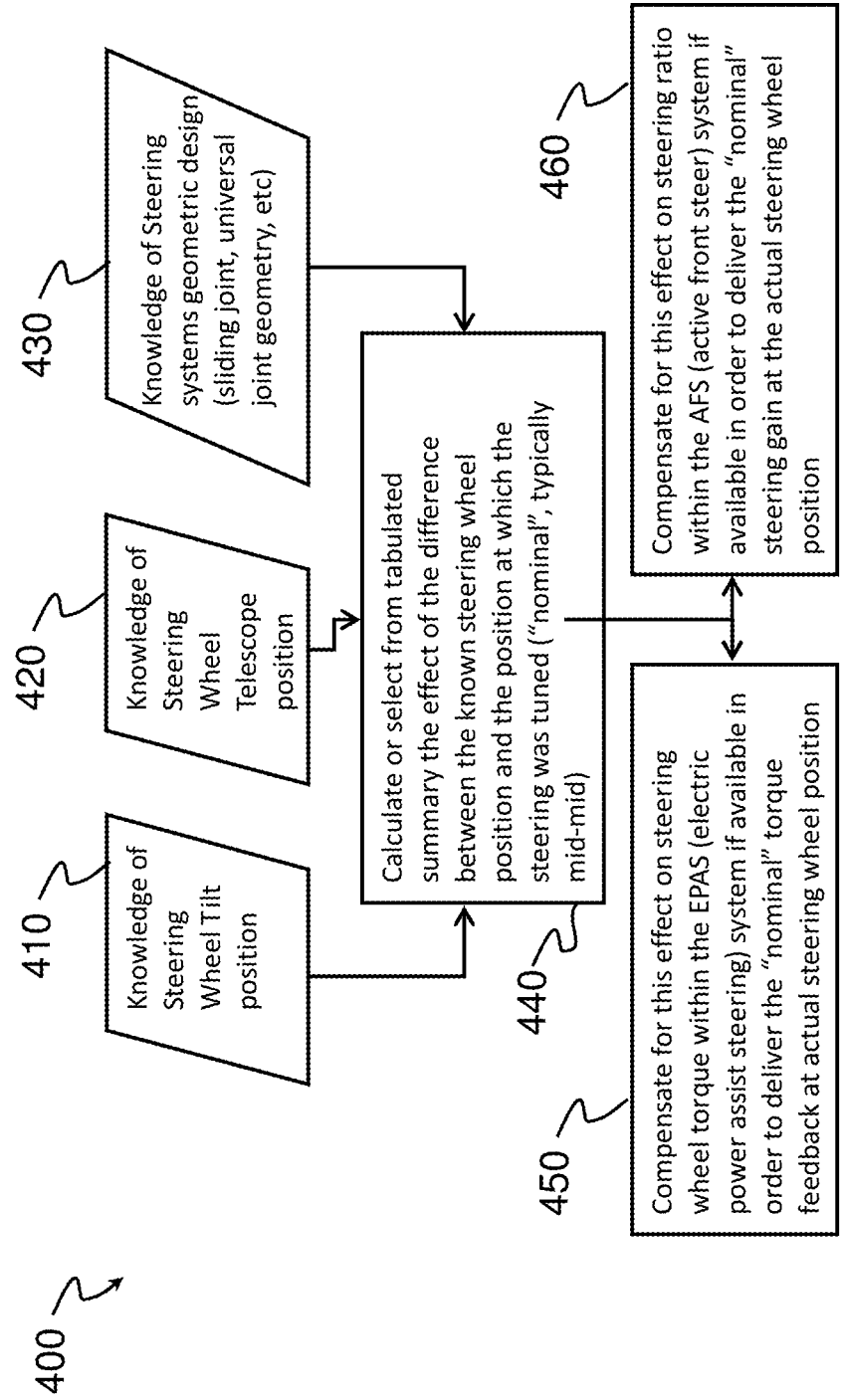
FIG. 4 is an exemplary flowchart illustrating a method of compensating for rake and telescope position in a vehicle steering system in accordance with the present teachings.

FIG. 4 is a flow chart 400 illustrating an exemplary method of compensating SR and/or SWT due to non-nominal positioning of a steering wheel. More particularly, via operations 410, 420 and 430, knowledge of a (e.g., real-time) steering wheel tilt position, knowledge of a steering wheel telescopic position and knowledge of a steering system's geometric design (e.g., sliding joints, u-joints, lengths, pivot points, etc.), are provided to a processing component such as a (e.g., programmable) hardware processor or vehicle control system such as an electronic control unit (ECU) which performs an operation 440 which calculates or which selects from a tabulated summary, the effect of a difference between the known (e.g., real-time) steering wheel position and a reference nominal (e.g., mid-rake; mid-telescopic) position at which the steering was tuned (e.g., nominal tuning). The knowledge gained at operations 410, 420 and 430, and operations performed at operation 440, would vary from vehicle make/model to vehicle make/model. For example, each vehicle has unique steer geometry between the steering wheel and the steering gear. This can include the number of joints as well as the geometric location of the joints. This sums up to an inherently non-linear ratio curve versus SWA as shown in example plot of SR. The geometric calculation of the phasing and the magnitude changes away from this nominal curve with changes throughout the rake and telescope of the steering. The calculations (e.g. for the programming for operation 440) can be done, for example, with a CAD review of joint locations and orientations.

Regarding example adjustment(s) per the operation 440, knowing that the SR has increased or decreased at a new non-nominal tilt and/or telescope position for a given SWA input, allows for the adjustment of EPAS and/or AFS to account for the difference. For example, if ratio has increased, then the SWT will go down and the vehicle steering response will also go down. These systems can be altered to correct back to nominal response: EPAS to provide less assist, raising the efforts and AFS to provide more steering angle overlay, increasing the SR back to nominal level.

The operation 440 may result in an output 450 which compensates for (e.g., offsets) any non-nominal torque effect on steering wheel torque, e.g., via the PAS 130 (e.g., EPAS) system, in order to compensate for such non-nominal torque effect so as to deliver (i.e., emulate) the nominal torque feedback effect felt by the vehicle's driver, while the steering system in the non-nominal positioning. Such output may be based upon one or more pre-determined (e.g., pre-programmed) algorithm and/or one or more look-up tables, which take into account, the above received knowledge (e.g., data).

One non-limiting example process of the invention may be performed as follows: The vehicle is turned on. A driver may select a steering wheel position, i.e., rake and/or telescope position. The vehicle (e.g., via operation 440) compares a real-time steering wheel position to a reference steering wheel position, and determines (e.g., calculates or looks-up) an offset to be used in ongoing SWT and SR calculation. That is, the actual position is compared with nominal, any resulting offset is input into calculation/lookup table for resulting difference in SR curve vs SWA, and this then drives adjustments in PAS and/or AFS to return driver experience wrt SWT and/or vehicle steer response back to nominal.

Continuing, the operation 440 may result in an output 460 which compensates, e.g., via an active steering system, for any non-nominal ratio effect on steering ratio, in order to compensate for (offsets) such non-nominal ratio effect so as to deliver (i.e., emulate) the nominal ratio feedback effect felt by the vehicle's driver, while the steering system in the non-nominal positioning. Again, such output may be based upon one or more pre-determined (e.g., pre-programmed) algorithm and/or one or more look up tables, which take into account, the above received knowledge (e.g., data).

Regarding determining the proper algorithm(s) and/or look-up table values for a particular vehicle, measurements can be carried out during a calibration process during vehicle production and/or engineering design, to determine such algorithm(s) and/or to populate look-up table values. Additionally, the algorithm(s) and/or values in the look-up table can be re-checked and updated periodically during the vehicles lifetime, for example during servicing.

Algorithm(s) calculation and/or look-up of tables, may be carried out substantially continuously in real-time during vehicle operation, so that the invention is substantially continuously capable of compensating for the non-nominal steering wheel feel resultant from any non-nominal positioning of the steering column and/or steering wheel.

In the event that it proves difficult in any particular implementation to totally compensate for any non-nominal ratio effect so as to deliver (i.e., emulate) the nominal ratio feedback effect felt by the vehicle's driver, or to totally compensate for any non-nominal torque effect on steering wheel torque, the invention of the present teachings still provides a substantial advantage in that steering wheel feel at non-nominal positioning, is at least closer to, the actual steering wheel feel at the nominal steering column and/or steering wheel positioning.

In the event that the granularity of compensating outputs does not match with the granularity of the steering column 104 and/or steering wheel 102 positions, then interpolation may be able to be applied to adjust the outputs 350 or 360 to the granularity of the steering column 104 and/or steering wheel 102 positions.

In the description above, reference is made to the electronic control unit (ECU) as a single component. However, this configuration is merely an example and is subject to a variety of implementation-specific variations. For example, in some embodiments, the functions described in reference to the ECU may be performed across multiple ECUs or among multiple components of the ECU. Further, the ECU may include one or more structural components that enable the ECU to function as a controller. The ECU, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system of the controller to operate the logic or portions of the logic presented in the methods disclosed herein. For example, in certain embodiments, the ECU may include computer code disposed on a computer-readable storage medium or a process controller that includes such a computer-readable storage medium. The computer code may include instructions, for example, for initiating a control function to compensate for changes made to the tilt and telescope positions of the steering wheel based on feedback received from another component of the vehicle, such as from sensors configured to generate data related to a position of the steering wheel when a driver adjusts the position.

While the present teachings have been disclosed in terms of exemplary embodiments in order to facilitate a better understanding, it should be appreciated that the present teachings can be embodied in various ways without departing from the scope thereof. Therefore, the present disclosure should be understood to include all possible embodiments which can be embodied without departing from the scope of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiments described herein be considered as exemplary only.

What is claimed is:

1. A method of controlling nominal vehicle steering characteristics in a vehicle steering system, comprising:
    determining an actual position of an adjustable steering wheel and/or steering column of the vehicle;
    comparing the actual position to a reference position of the steering wheel and/or steering column; and
    based at least in part on the comparison, adjusting at least one of a steering ratio and a steering torque feedback in the vehicle steering system.

2. The method as claimed in claim 1, wherein the comparing the actual position to the reference position of the steering wheel and/or steering column includes determining a percentage of change of the steering ratio at each steering wheel angle in a range of possible steering wheel angles.

3. The method as claimed in claim 1, wherein the adjusting at least one of the steering ratio and the steering torque feedback includes adjusting the steering ratio or the steering torque feedback to a nominal value associated with the nominal vehicle steering characteristics.

4. The method as claimed in claim 1, wherein the determining an actual position of the adjustable steering wheel and/or steering column includes determining an amount of tilt of the steering wheel of the and/or the steering column.

5. The method as claimed in claim 4, wherein the comparing the actual position to the reference position includes determining a difference between the amount of tilt and a reference tilt value.

6. The method as claimed in claim 5, further comprising identifying a number of universal joints in the steering system.

7. The method as claimed in claim 6, wherein the adjusting at least one of the steering ratio and the steering torque feedback in the vehicle steering system is based at least in part on the number of universal joints identified.

8. The method as claimed in claim 1, wherein the determining an actual position of the adjustable steering wheel and/or steering column includes determining an amount of telescoping of the steering wheel and/or steering column.

9. The method as claimed in claim 8, wherein the comparing the actual position to the reference position includes determining a difference between the amount of telescoping and a reference telescoping value.

10. The method as claimed in claim 1, wherein the determining an actual position of the adjustable steering wheel and/or steering column includes receiving, at a controller of the vehicle steering system, data indicative of an amount of tilt and an amount of telescoping of the steering wheel and/or steering column.

11. The method as claimed in claim 10, further comprising receiving, at the controller, data indicative of number of universal joints in the steering system.

12. The method as claimed in claim 11, wherein the adjusting at least one of the steering ratio and the steering wheel torque feedback in the vehicle steering system includes adjusting the steering ratio of the vehicle steering system to compensate for a change in steering ratio caused by the amount of tilt and the amount of telescoping of the steering wheel and/or steering column.

13. The method as claimed in claim 12, further comprising adjusting the steering ratio with an active front steer system of the vehicle.

14. The method as claimed in claim 11, wherein the adjusting at least one of the steering ratio and the steering torque feedback in the vehicle steering system includes adjusting a steering torque feedback of the vehicle steering system to compensate for a change in steering torque feedback caused by the amount of tilt and the amount of telescoping of the steering wheel and/or steering column.

15. The method as claimed in claim 14, further comprising adjusting the steering torque feedback with an electric power assist steering system of the vehicle.

16. The method as claimed in claim 1, wherein the comparing the actual position to the reference position includes accessing a table stored in a controller of the vehicle steering system, the table correlating a plurality of non-reference tilt and/or telescoping positions to a plurality of steering ratios and/or steering torque feedback.

17. A method of controlling nominal vehicle steering characteristics in a vehicle steering system, comprising:
   determining an actual position of an adjustable steering wheel and/or steering column of the vehicle;
   comparing the actual position to a reference position of the steering wheel and/or steering column;
   based at least in part on the comparison, calculating a percentage of change in a steering ratio for a range of steering wheel angles; and
   based on the percentage of change, adjusting at least one of a steering ratio and a steering torque feedback in the vehicle steering system to a nominal value associated with the nominal vehicle steering characteristics.

18. A system for controlling nominal vehicle steering characteristics in a vehicle steering system, comprising:
   at least one sensor configured to provide data relating to a position of an adjustable steering wheel and/or steering column of the steering system;
   a controller operatively associated with the at least one sensor and configured to:
   determine an actual position of the adjustable steering wheel and/or steering column based on the sensor data;
   compare the actual position to a reference position of the steering wheel and/or steering column; and
   based at least in part on the comparison, adjust at least one of a steering ratio and a steering torque feedback in the vehicle steering system.

19. The system as claimed in claim 18, wherein the controller is further configured to determine a percentage of change of the steering ratio at each steering wheel angle in a range of possible steering wheel angles.

20. The system as claimed in claim 18, wherein the controller is further configured to adjust the steering ratio or the steering torque feedback to a nominal value associated with the nominal vehicle steering characteristics.

21. The system as claimed in claim 18, wherein the controller is further configured to determine an amount of tilt of the steering wheel based on sensor data and to determine a difference between the amount of tilt and a reference tilt value stored on a memory associated with the system.

22. The system as claimed in claim 18, wherein the controller is further configured to adjust at least one of the steering ratio and the steering torque feedback in the vehicle steering system based at least in part on the number of universal joints in the steering system.

23. The system as claimed in claim 18, wherein the controller is further configured to determine an amount of telescoping of the steering wheel and/or steering column based on sensor data and to determine a difference between the amount of telescoping and a reference telescoping value stored on a memory associated with the system.

24. The system as claimed in claim 18, wherein the controller is further configured to adjust the steering ratio of the vehicle steering system to compensate for a change in steering ratio caused by an amount of tilt and an amount of telescoping of the steering wheel and/or steering column.

25. The system as claimed in claim 24, wherein the controller is further configured to adjust a steering torque feedback of the vehicle steering system to compensate for a change in steering torque feedback caused by the amount of tilt and the amount of telescoping of the steering wheel and/or steering column.

26. The system as claimed in claim 18, further comprising a memory associated with the controller, wherein the memory contains a table correlating a plurality of non-reference tilt and/or telescoping positions to a plurality of steering ratios and/or steering torque feedback.

27. A vehicle having controlled nominal vehicle steering characteristics, comprising:
   a steering wheel;
   a steering column;
   at least one sensor configured to provide data relating to a position of the steering wheel and/or steering column;
   a controller operatively associated with the at least one sensor and configured to:
   determine an actual position of the steering wheel and/or steering column based on the sensor data;
   compare the actual position to a reference position of the of the steering wheel and/or steering column; and based at least in part on the comparison, adjust at least one of the steering ratio and a steering torque feedback in the vehicle steering system.

28. A non-transitory, tangible, machine-readable media embodying a program which, when implemented via a controller, effecting operations for controlling nominal vehicle steering characteristics in a vehicle steering system, the operations comprising:
  determining an actual position of an adjustable steering wheel and/or steering column of the vehicle;
  comparing the actual position to a reference position of the steering wheel and/or steering column;
  based at least in part on the comparison, adjusting at least one of a steering ratio and a steering torque feedback in the vehicle steering system.

* * * * *